Figure 1:
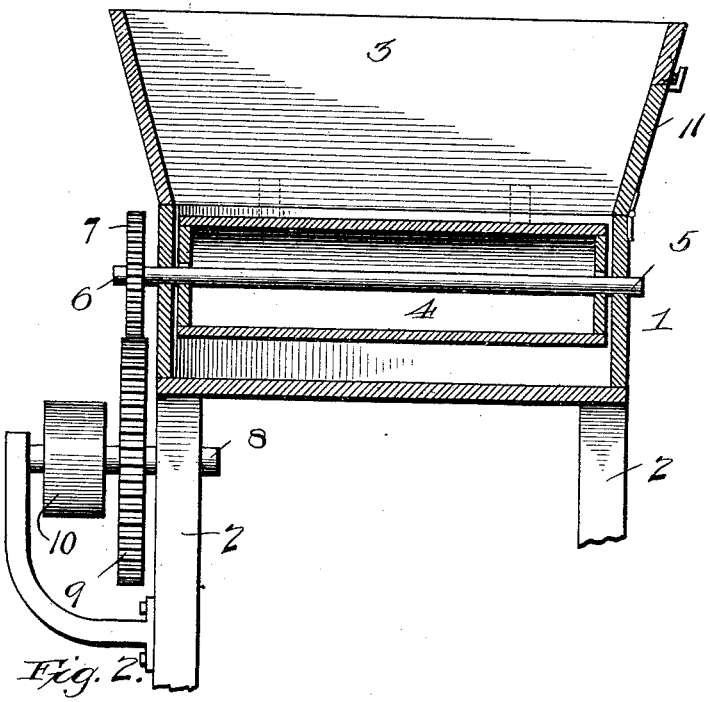

No. 840,000. PATENTED JAN. 1, 1907.
J. & F. KERR.
VEGETABLE PEELER.
APPLICATION FILED OCT. 13, 1905.

Witnesses

Inventors
JUDSON KERR &
FRANK KERR
By Thos. D. Moulds
Attorney

UNITED STATES PATENT OFFICE.

JUDSON KERR AND FRANK KERR, OF PHILADELPHIA, PENNSYLVANIA.

VEGETABLE-PEELER.

No. 840,000.  Specification of Letters Patent.  Patented Jan. 1, 1907.

Application filed October 13, 1905. Serial No. 282,607.

*To all whom it may concern:*

Be it known that we, JUDSON KERR and FRANK KERR, citizens of the United States, residing at Philadelphia, in the county of Philadelphia and State of Pennsylvania, have invented new and useful Improvements in Vegetable-Peelers, of which the following is a specification.

This invention relates to improvements in devices for peeling potatoes and other similar vegetables; and it has for its object the provision of a simple, compact, and effective device whereby the skin of the potato or other vegetable or fruit may be completely and quickly removed with the least possible loss of the article being peeled.

To this end the invention consists in the novel construction, combination, and arrangement of the several parts of the device, as hereinafter described, illustrated in the drawings, and more particularly pointed out in the claims hereunto appended.

Figure 2:
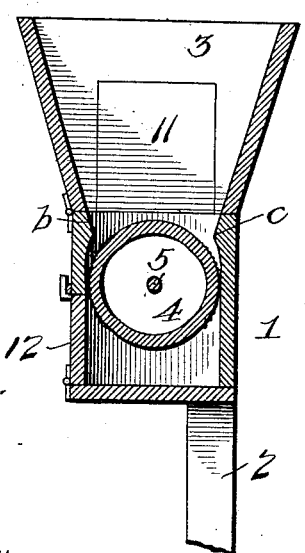
Figure 3:
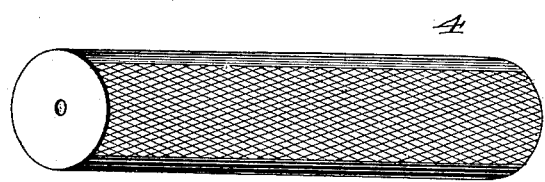

In the drawings, Figure 1 represents a vertical longitudinal sectional view of the device, showing the interior construction and the relative arrangement of the parts. Fig. 2 represents a vertical cross-section of the device, also showing the interior construction and the relative arrangement of the several parts; and Fig. 3 is a perspective view of the peeling-drum, elliptical in cross-section, showing a portion of the curved surface thereof serrated or roughened.

Referring to the drawings, the numeral 1 indicates the body or casing of the device, and 2 legs or other suitable supports therefor.

The numeral 3 indicates a hopper suitably hinged to the top of the casing 1 and which is adapted to fit over and upon the top of said casing. The upper portions of the side walls of the casing 1 are beveled upwardly and outwardly, as shown at *b*, conforming with the lines of the inner walls of the hopper and forming a downward continuation thereof.

The numeral 4 indicates the peeling-drum, which is elliptical in cross-section, as shown, and has portions of its curved surface serrated or roughened. These roughened portions of the curved surface of the peeling-drum comprise about two-thirds, preferably, of its entire curved area and is divided, preferably, into two sections, each of said sections being bounded by longitudinal lines drawn from points about midway between the ends of the greatest and shortest diameters, as shown. This peeling-drum 4 is rigidly secured on a suitable shaft 5 and is suitably mounted in said casing immediately beneath the hopper 3 in such position that its elliptical surface will be slightly below the projecting edges or shoulders *c* of the casing, said shaft 5 being suitably journaled in the ends of the casing. The end 6 of said shaft 5, which projects beyond the end of said casing, is provided with a suitable pinion 7, rigidly secured thereon.

The numeral 8 indicates a shaft suitably journaled in one of the supports 2 of the casing and an arm extending therefrom and has rigidly mounted thereon a pinion 9, adapted to mesh with the pinion 7 on the end of the shaft 5. 10 indicates a suitable pulley also rigidly secured on the shaft 8, and is for the purpose of communicating motion thereto from any suitable source of power.

The numeral 11 indicates a trap or door in one end of the hopper 3 and is for the purpose of permitting ready access to the drum or cylinder and also to permit the easy removal of the peeled vegetables from the device, and 12 indicates a similar trap or door in one side of the casing, at or near the bottom thereof, and is for the purpose of permitting ready access to the interior of said casing for cleaning the same.

The operation of the device is as follows: Motion having been communicated from any suitable source to the peeling-drum, the vegetables or fruits to be peeled are dumped into the hopper and fall onto the revolving peeling-drum, where they are in turn rotated, jostled up and down, and around and about and against the projecting edge or shoulder *c*, where their forward motion is arrested, when they are forced upward by those behind and again fall back upon the peeler. This peeling-drum in addition to removing the peeling acts as an agitator and jostles the fruit or vegetables being acted on in such a manner that every part of such fruit or vegetable is thoroughly peeled, and that without waste. The dirt from the peeling falls to the bottom of the casing and may be removed therefrom, as is evident. When the fruit or vegetables have been thoroughly peeled, the door 11 of the hopper is opened, and they are then removed from the device, or, if desired, they may be taken directly from the hopper through the top thereof.

Having thus fully described our invention, what we claim, and desire to secure by Letters Patent of the United States, is—

1. In a device of the character described, the combination with a suitable casing, of a peeling-drum, elliptical in cross-section, revolubly mounted in said casing and having portions of its curved surface serrated or roughened.

2. In a device of the character described, the combination with a suitable casing, and projecting edges or shoulders on the side walls near the top thereof, of a peeling-drum, elliptical in cross-section, revolubly mounted in said casing below said projecting edges or shoulders, and having portions of its curved surface serrated or roughened.

3. In a device of the character described, the combination with a suitable casing having the upper portion of its side walls beveled upwardly and outwardly, and projecting edges or shoulders at the bottoms or lower ends of said beveled portions, of a peeling-drum, elliptical in cross-section, revolubly mounted in said casing below said projecting edges or shoulders, and having portions of its curved surface serrated or roughened.

In testimony whereof we affix our signatures in presence of two subscribing witnesses.

JUDSON KERR.
FRANK KERR.

Witnesses:
DAVID A. HAMMOND,
ROBT. HAMMOND.